(12) United States Patent
Tsunekawa et al.

(10) Patent No.: US 6,974,620 B1
(45) Date of Patent: *Dec. 13, 2005

(54) POLYESTER FILM FOR HEAT-RESISTANT CAPACITOR, METALLIZED FILM THEREOF, AND HEAT-RESISTANT FILM CAPACITOR CONTAINING THE SAME

(75) Inventors: Tetsuya Tsunekawa, Shiga (JP); Masayoshi Asakura, Shiga (JP); Tetsuya Yamagata, Shizuoka (JP)

(73) Assignee: Toray Industries, Inc., (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/980,651

(22) PCT Filed: Feb. 14, 2000

(86) PCT No.: PCT/JP01/01012

§ 371 (c)(1),
(2), (4) Date: Jan. 24, 2002

(87) PCT Pub. No.: WO01/65575

PCT Pub. Date: Sep. 7, 2001

(30) Foreign Application Priority Data

Feb. 28, 2000 (JP) .............................. 2000-050811

(51) Int. Cl.$^7$ ............................ D06N 7/04; B32B 7/02; B32B 27/00; B32B 27/06; B32B 27/36
(52) U.S. Cl. .................. 428/141; 428/480; 428/473.5; 428/910; 428/213; 428/215
(58) Field of Search ............... 428/141, 213, 428/215, 480, 473.5, 910, 694 SG

(56) References Cited

U.S. PATENT DOCUMENTS

| | | | |
|---|---|---|---|
| 2,558,339 A | 6/1951 | Cohen | |
| 2,558,341 A | 6/1951 | Cory et al. | |
| 2,563,547 A | 8/1951 | Paddock et al. | |
| 2,563,548 A | 8/1951 | Plante | |
| 2,564,636 A | 8/1951 | Bennett, Jr. et al. | |
| 2,564,637 A | 8/1951 | Chase | |
| 2,565,556 A | 8/1951 | Gruber | |
| 2,596,565 A | 5/1952 | Kautenberg | |
| 2,596,566 A | 5/1952 | Lacy et al. | |
| 2,598,478 A | 5/1952 | Worchester, Jr. | |
| 2,598,536 A | 5/1952 | Hansen | |
| 2,599,171 A | 6/1952 | Freeman | |
| 2,606,912 A | 8/1952 | Sifferd et al. | |
| 2,606,914 A | 8/1952 | Bernstein et al. | |
| 2,622,678 A | 12/1952 | Peterson | |
| 2,834,580 A | 5/1958 | True et al. | |
| 4,141,927 A | 2/1979 | White et al. ........... 260/857 PA |
| 4,226,826 A * | 10/1980 | Motegi et al. ........... 264/235.8 |
| 5,527,594 A * | 6/1996 | Kinoshita et al. ........... 428/212 |
| 5,599,658 A * | 2/1997 | Greener et al. ............. 430/533 |
| 5,770,301 A * | 6/1998 | Murai et al. ................. 428/213 |
| 6,420,011 B1 * | 7/2002 | Tsunekawa et al. ......... 428/141 |

FOREIGN PATENT DOCUMENTS

| | | |
|---|---|---|
| JP | 53-64753 | 6/1978 |
| JP | 55-35553 A | 3/1980 |
| JP | 63-182351 A | 7/1988 |
| JP | 5-124100 | 5/1993 |
| JP | 7-21070 | 3/1995 |
| JP | 9-48852 | 2/1997 |
| JP | 10-27727 A | 1/1998 |

* cited by examiner

Primary Examiner—Harold Pyon
Assistant Examiner—Catherine A. Simone
(74) Attorney, Agent, or Firm—DLA Piper Rudnick Gray Cary US LLP

(57) ABSTRACT

A polyester film for use in a capacitor having high heat resistance, which consists of a biaxially oriented film containing a polyester (A) as a main component and a polyimide (B) and has a glass transition temperature of 105° C. to 145° C. and an elongation at break in the machine direction of 70% to 150%, offers a high glass transition temperature and excellent insulation volume resistance and insulation breakdown voltage at high ambient temperatures. This film can produce a metallized film for use in a capacitor having high heat resistance and also a film capacitor having high heat resistance.

8 Claims, No Drawings

POLYESTER FILM FOR HEAT-RESISTANT CAPACITOR, METALLIZED FILM THEREOF, AND HEAT-RESISTANT FILM CAPACITOR CONTAINING THE SAME

TECHNICAL FIELD

The present invention relates to a polyester film suitable for a capacitor having high heat resistance. More particularly, this invention relates to a polyester film for use in a heat-resistant capacitor which has excellent insulation volume resistance and insulation breakdown voltage even at high ambient temperature, and to a metallized film derived from such a polyester film, and also to a capacitor with high heat resistance obtained from such a metallized film and which has superior charging life at high ambient temperature.

BACKGROUND ART

Heretofore, one type of capacitor has found a wide range of applications, in which the capacitor has a dielectric layer formed from a biaxially oriented polyester film and a metal-deposited layer disposed as an electrode on the surface of the former layer. In recent years, other technological developments have also been made public in which polyester is used as a main component and is blended with a different variety of polyester or polycarbonate to broaden the range of working temperatures up to a high temperature side suited for such a capacitor. Japanese Examined Patent Application Publication No. 7-21070, for instance, discloses a film for use in a capacitor comprising a blend of various varieties of polyester.

For use as a dielectric in a capacitor, a polyester film is usually wound together with a metal foil, or in the form of a metallized film derived by forming a metal layer in advance on one surface of the polyester film, or is overlaid one on another polyester film such that compact shaping is attained. The resulting capacitor element is then subjected in turn to pressing, electrode processing, resin embedding and case containment. In general, the element is treated with heat at a constant temperature to stabilize its electrical properties (mainly capacity).

Such a polyester film when used as a dielectric in a capacitor is susceptible to a number of thermal and mechanical stresses before the capacitor is completed. For these reasons, the capacitor is often finished with lower properties than those expected to accrue from the insulation resistance and insulation breakdown voltage retained inherently in the polyester film. Obviously, a polyester film with poor performance leads to a capacitor having low capacitor properties. When malfunction or breakage occurs (due to poor charging life) while a capacitor product is actually being used in a working environment after assembly in the associated equipment, a serious problem arises with regard to the safety of the equipment.

Attempts have hitherto been made to address the foregoing problems in the light of research conducted-on the strength, extension and surface roughness of a film, or on the pressing and heat treatment conditions used for capacitor production. In Japanese Unexamined Patent Application Publication No. 53-64753, for example, a superior polyester film for capacitor use is disclosed in which the strength of the film in the machine direction and the number of protrusions on the film surface are specified.

However, the conventional polyester films have a glass transition temperature in the vicinity of 100° C. When such a polyester film is used as a dielectric in a capacitor, it tends to considerably lower its insulation breakdown voltage at 90° C. or higher, causing the resulting capacitor to break easily. The conventional type film must only be used in the range of temperatures of 90° C. or lower, but this is essentially ineffective in respect of film performance. Furthermore, the film formed from a blend of varieties of polyester is higher in heat resistance as described in the above background art, but is disadvantageous as it is less likely to crystallize due to ester interchange and therefore is low in dimensional stability and unstable in film formation. This film is difficult to warrant practical application and conducive to poor properties such as insulation breakdown voltage and the like.

It is an object of the present invention to eliminate the above drawbacks of the conventional polyester films, providing a polyester film for use in a heat-resistant capacitor which has excellent electrical properties (such as insulation volume resistance, insulation breakdown voltage and the like) even at high ambient temperatures of 90° C. or higher; a metallized film derived from such a polyester film; and a film capacitor with high heat resistance which uses such a metallized film and has superior charging life at high ambient temperature.

DISCLOSURE OF THE INVENTION

The present invention has been made as a result of intensive research conducted on the above problems. The polyester film of this invention for use in a heat-resistant capacitor represents a biaxially oriented polyester film that comprises a polyester (A) and a polyimide (B) and has a glass transition temperature of 105° C. to 145° C. and an elongation at break in the machine direction of 70% to 150%.

In one preferred embodiment of the polyester film according to the present invention for use in a capacitor with heat resistance; the surface roughness (Ra) is 10 nm to 140 nm, the polyester (A) is a polyester composed mainly of ethylene terephthalate, the polyimide (B) is a polyether imide, the onset temperature in the dielectric loss (tan δ) is 85° C. to 120° C., the insulation volume resistance (IR) at 125° C. is $1.0 \times 10^{14}$ Ω·cm to $5.0 \times 10^{16}$ Ω·cm, the content of the polyimide (B) is 5 to 30% by weight based on the total weight of that film, and the heat shrinkage in the machine direction after a lapse of 30 minutes at 150° C. is 2.5% or less.

In addition, the metallized film of the present invention for use in a heat-resistant capacitor is obtained by forming a metal layer, by deposition or the like, on at least one surface of the above-stated polyester film for use in a heat-resistant capacitor. Furthermore, the film condenser with heat resistance according to this invention is produced using such a metallized film for use in a heat-resistant capacitor.

BEST MODE FOR CARRYING OUT THE INVENTION

The polyester film of the present invention for use in a heat-resistant capacitor comprises a polyester (A) and a polyimide (B).

The polyester (A) added to constitute the polyester film of this invention for use in a heat-resistant capacitor is a polyester structured to contain, as chief components, an aromatic dicarboxylic acid, an alicyclic dicarboxylic acid or an aliphatic dicarboxylic acid and a diol. Aromatic dicarboxylic acid components include, for example, tere-phthalic acid, isophthalic acid, phthalic acid, 1,4-naphthalene-dicarboxylic acid, 1,5-naphthalene-dicarboxylic acid, 2,6-naphthalenedicarboxylic acid, benzophenone-dicarboxylic acid, 4,4'-diphenyldicarboxylic acid, 3,3'-diphenyldicarboxylic acid, 4,4'-diphenyletherdicarboxylic acid, 4,4'-diphenylsulfonedicarboxylic acid and the like. Of these components, terephthalic acid and 2,6-naphthalene-dicarboxylic acid are preferred. Alicyclic dicarboxylic acid components include, for example, hexahydroterephthalic acid, 1,3-adamantanedicarboxylic acid, cyclohexanedicarboxylic acid and the like. Aliphatic dicarboxylic acid components include, for example, adipic acid, succinic acid, azelaic acid, suberic acid, sebacic acid, dodecanedionic acid and the like. The components listed above can be used singly or in combination with two or more. Moreover, an oxy acid such as hydroxyethoxysuccinic acid or the like may be copolymerized in a small amount. On the other hand, diol components include, for example, aromatic diols such as chlorohydroquinone, methylhydroquinone, 4,4'-dihydroxybiphenyl, 4,4'-dihydroxy-diphenyl sulfone, 4,4'-dihydroxydiphenyl sulfide, 4,4'-dihydroxybenzophenone, p-xylene glycol and the like, ethylene glycol, 1,2-propanediol, 1,3-propanediol, neopentyl glycol, 1,3-butanediol, 1,4-butanediol, 1,5-pentanediol, 1,6-hexanediol, 1,2-cyclohexanedimethanol, 1,3-cyclohexane-dimethanol, 1,4-cyclohexanedimethanol, diethylene glycol, triethylene glycol, polyalkylene glycol, 2,2'-bis(4'-β-hydroxyethoxyphenyl)propane and the like. From among the listed diol components, ethylene glycol, 1,4-butanediol, 1,4-cyclohexanedimethanol and diethylene glycol are preferably selected. Ethylene glycol is particularly preferred. These components can be used alone or in combination. Moreover, the polyester according to this invention may have a poly- or mono-functional compound copolymerized to such an extent that the resulting polymer is substantially linear in structure. Functional compounds include trimellitic acid, pyromellitic acid, glycerol, pentaerythritol, 2,4-dioxysuccinic acid, lauryl alcohol, phenylisocyanic acid and the like. In addition to the glycol components, an aromatic hydroxy-carboxylic acid such as p-hydroxysuccinic acid, m-hydroxy-succinic acid or 2,6-hydroxynaphthoic acid, or p-aminophenol or p-aminosuccinic acid may be further copolymerized, but in such a small amount that the object of this invention is not adversely affected.

In order to achieve the effects of the present invention, a polyester is preferred which contains an ethylene terephthalate unit, or ethylene-2,6-naphthalate as a main component. Particularly preferred is a polyester composed mainly of an ethylene terephthalate unit, for example, polyethylene terephthalate (PET), or a copolymer or a modification composed mainly of the latter polymer. The term polyester composed mainly of an ethylene terephthalate unit used herein refers to a polyester structured to contain an ethylene terephthalate unit in an amount of at least 70% by mol or more. Here, the polyester can have an acid component copolymerized in a small amount, of which the component includes those other than terephthalic acid. A glycol component other than ethylene glycol may also be added as a copolymeric component. Examples of the acid component other than terephthalic acid are isophthalic acid, naphthalenediarboxylic acid, adipic acid and sebacic acid. As the glycol component other than ethylene glycol, trimethylene glycol, diethylene glycol tetramethylene glycol and cyclohexanedimethanol are preferred. A base material for the polyester (A) to be used in this invention has an inherent viscosity of preferably 0.55 to 2.0 dl/g, more preferably 0.6 to 1.4 dl/g, and most preferably 0.65 to 1.0 dl/g, with regard to melt kneading with the polyimide (B), film formability and melt heat stability.

The polyimide (B) most suitable for the present invention is a polymer that contains cyclic imide groups and is capable of melt forming. The polyimide is not particularly restricted if it satisfies the purpose of this invention. More preferably, polyether imide is used which contains an aromatic, alicyclic or aliphatic ether unit and a cyclic imide group as recurring units. Examples of polyether imides are disclosed for instance in U.S. Pat. No. 4,141,927, U.S. Pat. No. 2,622,678, U.S. Pat. No. 2,606,912, U.S. Pat. No. 2,606,914, U.S. Pat. No. 2,596,565, U.S. Pat. No. 2,596,566 and U.S. Pat. No. 2,598,478, and examples of polymers are also disclosed for instance in U.S. Pat. No. 2,598,536 and U.S. Pat. No. 2,599,171, Japanese Unexamined Patent Application Publication No. 9-48852, and U.S. Pat. No. 2,565,556, U.S. Pat. No. 2,564,636, U.S. Pat. No. 2,564,637, U.S. Pat. No. 2,563,548, U.S. Pat. No. 2,563,547, U.S. Pat. No. 2,558,341, U.S. Pat. No. 2,558,339 and U.S. Pat. No. 2,834,580.

The polyimide (B) may have a structural unit other than the units of the cyclic imide and ether, for example, an aromatic, aliphatic or alicyclic ester unit, an oxycarbonyl unit and the like attached to the main chain, but to such an extent that the structural unit does not impair the effects of the present invention.

Moreover, the polyether imide may have a structural unit other than the units of the cyclic imide and ether, for example, an aromatic, aliphatic or alicyclic ester unit, an oxycarbonyl unit or the like attached to the main chain, but to such an extent that the structural unit does not impair the effects of the present invention.

Specific examples of the polyether imide suitable for use in the present invention are polymers represented by the following general formula:

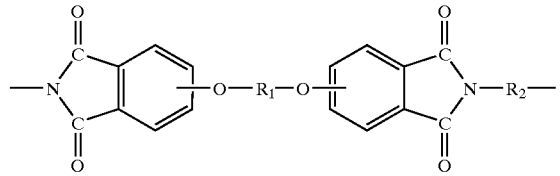

(where $R_1$ denotes a divalent aromatic or aliphatic residue having 6 to 30 carbon atoms; and $R_2$ denotes a divalent organic group selected from the group consisting of a divalent aromatic residues having 6 to 30 carbon atoms, an alkylene group having 2 to 20 carbon atoms, a cycloalkylene group having 2 to 20 carbon atoms, or polydiorgano-siloxanes derived from chain termination with an alkylene group having 2 to 8 carbon atoms.)

Examples of $R_1$ and $R_2$ noted above are aromatic residues represented by the following formulae:

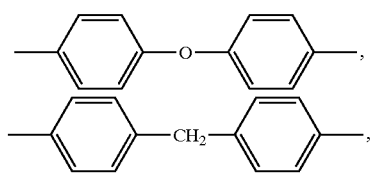

-continued

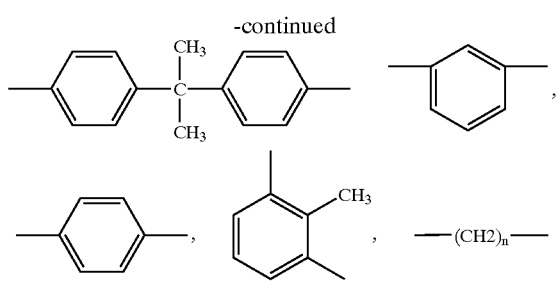

In the present invention, a condensation polymer is preferred which is obtained from a condensation reaction between 2,2-bis [4-(2,3-dicarboxyphenoxy)phenyl]propane dianhydride having a structural unit of the following formula and m-phenylenediamine or p-phenylenediamine. This is from the viewpoints of compatibility with the polyester (A), cost and melt moldability. Polyether imide of this type is commercially available under the trademark of "Ultem" (a registered trademark) from GE Plastics Co.

In the present invention, it is essential that the glass transition temperature of the biaxially oriented polyester film be 105° C. to 145° C. in order to achieve the object of this invention. If the glass transition temperature is lower than 105° C., a film capacitor with good charging life at high ambient temperature as desired by this invention cannot be produced. Conversely, if the glass transition temperature is 145° C. or higher, the film is less formable and frequently breakable or is low in insulation breakdown voltage at high ambient temperature. From the viewpoints of the film formability and charging life at high ambient temperature, the glass transition temperature of the biaxially oriented polyester film according to this invention is more preferably 115° C. to 140° C., and most preferably 120° C. to 135° C.

In the biaxially oriented polyester film of the present invention, the elongation at break in the machine direction is essentially 70% to 150%. The breaking strength in the machine direction is preferably 80% to 150%, more preferably 90% to 140%, and still more preferably 100% to 130%. Departures from the elongation at break in the machine direction from the range of this invention are responsible for

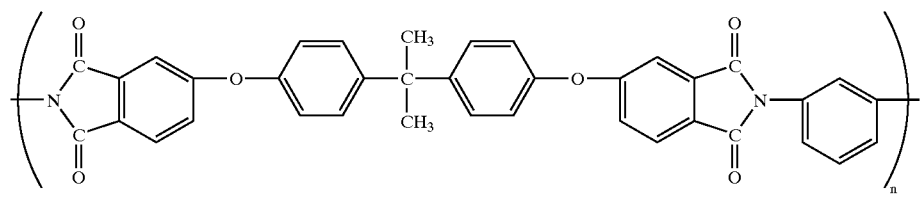

or

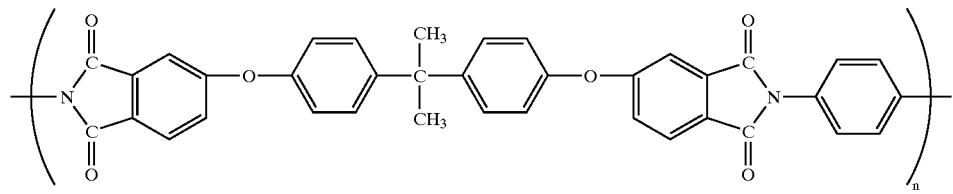

low insulation breakdown voltage as well as short charging

In the present invention, a polyether imide is preferred which has a glass transition temperature of preferably 35° C. or lower, and more preferably 250° C. or lower, with regard to the compatibility with the polyester (A), cost and melt moldability. Thus, a condensation polymer obtained from condensation of 2,2-bis[4-(2,3-dicarboxy-phenoxy)-phenyl] propane dianhydride with m-phenylenediamine or p-phenylenediamine is most preferred with regard to the compatibility with the polyester (A), cost and melt moldability. This polyether imide is manufactured by GE Plastics Co. and has been put on the market under the trademark of "Ultem 1000-Series or Ultem 5000-Series".

The polyester film of the present invention is a biaxially oriented polyester film comprising the polyester (A) and the polyimide (B). The degree of biaxial orientation can arbitrarily be varied in such a manner that a nonstretched film containing the polyester (A) and the polyimide (B) is stretched once, twice or more times both in the machine direction and in the transverse direction.

life, so that the effects of this invention are infeasible. Moreover, when the film is metallized on the surface by deposition, or when the metallized film is overlaid to produce a capacitor, problems such as a torn film, broken film or stretched film unfavorably occur.

In the biaxially oriented polyester film of the present invention, the surface roughness (Ra) is preferably 10 nm to 140 nm so as to achieve the object of this invention, i.e., to obtain a heat-resistant film capacitor having superior charging life at high ambient temperature while maintaining excellent properties specific to the polyester film of this invention. If the surface roughness is less than 10 nm, the polyester film used as a dielectric in a capacitor tends to partially deteriorate and yield poor charging life. If the surface roughness is more than 140 nm, the resulting capacitor lowers its insulation breakdown voltage, and therefore, a high performance capacitor is difficult to obtain. The surface roughness of the biaxially oriented polyester film according to this invention is preferably 20 nm to 120 nm, more preferably 30 nm to 100 nm, and most preferably 35 nm to 85 nm.

In the polyester film of the present invention, the ten-point mean roughness (Rt) is set preferably at 900 nm to 2000 nm, and more preferably 1200 nm to 1800 nm, when film slidability, film productivity and capacitor processability are considered. The number of coarse particles of 50 μm or more is preferably 15 particles/m² or less, and more preferably 5 particles/m² or less, because of poor performance due to insulation defect.

In the present invention, the content of the polyimide (B) in the biaxially oriented polyester film is preferably 5 to 30% by weight, more preferably 8 to 25% by weight, and still more preferably 10 to 20% by weight, with regard to electrical properties such as insulation volume resistance and insulation breakdown voltage at high ambient temperature and charging life at high ambient temperature. To enhance the electrical properties of the polyester (A) by kneading the polyester (A) and the polyimide (B) in an extruder such that they are permitted to become compatible with each other, the content of the polyimide (B) is set preferably at 5% by weight or more. To prolong the charging life of a capacitor at high ambient temperature, in which a capacitor is made by subjecting a film obtained at a step of melt extrusion to biaxial orientation and heat treatment and by orienting the film for use in that capacitor, the content of the polyimide (B) is set to be preferably 30% by weight or less.

In the biaxially oriented polyester film of the present invention, the onset temperature in dielectric loss (tan δ) is preferably 85° C. to 120° C., more preferably 90° C. to 110° C., and still more preferably 95° C. to 100° C. If the onset temperature in dielectric loss (tan δ) is lower than 85° C., the charging life at high ambient temperature tends to be low. If the onset temperature in dielectric loss (tan δ) is higher than 120° C., the polyester film causes low insulation breakdown voltage when using the film as a dielectric. Eventually, the charging life tends to be poor at high ambient temperature.

In the biaxially oriented polyester film of the present invention, the insulation volume resistance (IR) at 125° C. is preferably $1.0 \times 10^{14}$ Ω·cm to $5.0 \times 10^{16}$ Ω·cm, more preferably $5.0 \times 10^{14}$ Ω·cm to $1.0 \times 10^{16}$ Ω·cm, and still more preferably $8.0 \times 10^{14}$ Ω·cm to $8.0 \times 10^{15}$ Ω·cm. To improve the insulation breakdown voltage of a capacitor at high ambient temperature, in which the biaxially oriented polyester film of this invention is used as a dielectric, care must be taken since this improvement is sometimes difficult to ensure at less than $1.0 \times 10^{14}$ Ω·cm. If the insulation resistance at 125° C. exceeds $5.0 \times 10^{16}$ Ω·cm, the film tends to be less formable, and the charging life also tends to be poor.

In the biaxially oriented polyester film of the present invention, the thermal shrinkage in the machine direction after a lapse of 30 minutes at 150° C. is preferably 2.5% or less, more preferably 2.0% or less, and still more preferably 1.5% or less. If the thermal shrinkage at 150° C. is beyond 2.5%, care should be exercised as wrinkles occur on the film due to too high a thermal shrinkage at a step of metal deposition, thereby causing a decline in yield and electrical properties when using the film as a capacitor.

In the biaxially oriented polyester film of the present invention, the inherent viscosity (IV) is preferably 0.56 dl/g to 1.5 dl/g to reduce coarse particles in the film and thermal shrinkage of the film and improve film formability. A range of 0.61 to 0.8 dl/g is more preferable and a range of 0.62 to 0.70 dl/g still more preferable. If the inherent viscosity is less than 0.55 dl/g, the film is liable to break while it is being formed so that stable film formation is difficult to achieve. If the inherent viscosity is more than 1.5 dl/g, the film becomes thermally shrinkable at an unfavorably high level.

In the film of the present invention, the refractive index in the thickness direction is preferably 1.470 to 1.540 to permit the full effects of this invention to be achieved. A range of 1.490 to 1.540 is more preferable and a range of 1.490 to 1.530 still more preferable.

In the biaxially oriented polyester film of the present invention, the sum (YMD+YTD) of a Young's modulus in the machine direction (YMD) and a Young's modulus in the transverse direction (YTD) is preferably 8 to 15 GPa, more preferably 9 to 13 GPa and most preferably 10 to 12 GPa. If the sum of Young's moduli is less than 8 GPa, the film has high elongation at break as well as poor electrical properties such as insulation breakdown voltage and the like. If the sum of Young's moduli is more than 15 GPa, the film is high in thermal shrinkage and easy to tear.

To attain varied surface roughnesses of the polyester film of the present invention for use in a heat-resistant capacitor, it is desired that inorganic particles or organic particles are added to a resin containing a polyester composed mainly of an ethylene terephthalate unit and a polyimide. The particle diameter, content and shape of this particulate additive can be selected to suit the intended surface roughness of the film. The average particle diameter ranges preferably from 0.05 μm to 3 μm, and the content ranges preferably from 0.01% by weight to 3% by weight. As the particulate additive to be used herein, one sort of additive with a single average particle diameter can be added. More preferably, two or more sorts of particles with different average particle diameters may be added in combination.

Specific examples of the inorganic particles include oxides such as silicon oxide, aluminum oxide and titanium oxide, composite oxides such as kaolin, talc and montmorillonite, carbonates such as calcium carbonate and barium carbonate, sulfates such as calcium sulfate and barium sulfate, titanates such as barium titanate and potassium titanate, and phosphates such as calcium phosphate. These particles are not for purposes of limitation. Silicon oxide may be truly spherical or porous in structure.

Specific examples of the organic particles include vinyl particles such as polystyrene, crosslinked polystyrene, crosslinked styrene-acrylic, crosslinked acrylic and crosslinked styrene-methacrylic, and particles such as benzoguanamine-formaldehyde, silicone and polytetrafluoroethylene. These particles are not for purposes of limitation. Any organic polymeric fine particles may be used when they contain in the structure at least one portion remaining insoluble with respect to the polyester.

In the polyester film of the present invention for use in a heat-resistant capacitor, various other additives can also be incorporated in addition to the above inorganic particles and organic particles used to form protrusions on the film surface. These additives include, for example, antioxidants, heat stabilizers and nucleating agents and may be mixed in such a small amount that the effects of this invention are not adversely affected.

In the biaxially oriented polyester film of the present invention for use as a dielectric, the film thickness is preferably 0.5 μm to 15 μm, although this is not restrictive. Especially effective are films disclosed by this invention. For application to a heat-resistant film-wound capacitor, a film thickness of 1.5 to 10 μm is particularly preferred, and for application to a heat-resistant film chip-laminated capacitor, a film thickness of 0.5 to 3 μm is particularly preferred.

The capacitor of a wound or chip type can be produced by any known method. The capacitor may be a metal foil prepared by spreading a metal material in the form of a foil, or a thin metal sheet formed by disposing a metal material on the above dielectric (the polyester film for use in a heat-resistant capacitor) by vacuum deposition, sputtering or the like.

The metal material used to prepare the conductor is chosen from zinc, tin, titanium, nickel and alloys derived therefrom. These metals are not for purposes of limitation. The capacitor of the present invention is not restricted in respect to the shape; that is, the shape accepted herein may be of a usual type provided with lead wires, or a type (a so-called chip-shaped capacitor) in which the capacitor is soldered directly on the surface of a substrate with lead wires omitted. The capacitor of this invention may be applied both to the instance where alternating current is used and to the instance where direct current is used. Thus, this capacitor can find applications in the fields of automotive vehicles, inverter light fittings and communications equipment, all of which require prolonged service durability.

A preferred process for the formation of the polyester film according to the present invention for use in a heat-resistant capacitor will now be described below. In this process, polyethylene terephthalate (PET) is embodied as the polyester (A), and "Ultem" manufactured by GE Plastics CO. is embodied as the polyimide (B). However, such a process should not be construed as limiting this invention.

First of all, a glycol composed mainly of a terephthalic acid-based carboxylic acid or its alkyl ester and ethylene glycol is subjected to esterification or ester interchange at 130 to 260° C. in the presence of a metal catalyst compound composed of a calcium, magnesium, lithium or manganese element. Subsequently, a catalyst compound composed of an antimony, germanium or titanium element and a phosphoric compound are added, followed by polycondensation at a high degree of vacuum at a temperature of 220 to 300° C. Here, the phosphoric compound is chosen from, although not restricted to, phosphorous acid, phosphoric acid, phosphate triester, phosphonic acid, phosphonate and the like, two or more of which may be used in combination. The amount of the above catalytic compound to be added is not restricted. To enhance insulation volume resistance of the film, however, it is desired that the above metal catalyst compound be chosen from calcium, magnesium, lithium, manganese or the like and that the above phosphoric compound be added to meet the following equation:

$$0.3 \leq (M/P) \leq 1.8$$

(where M denotes the total molar quantity of the catalytic metal element such as calcium, magnesium, lithium, manganese or the like in the film, and P denotes the molar quantity of the phosphorus element in the film).

Moreover, an antioxidant, a heat stabilizer, a lubricating agent, an ultraviolet absorber, a nucleating agent, and inorganic or organic particles to be used to form protrusions on the film surface may be added, where desired, at a stage optionally selected between esterification or ester interchange and polycondensation.

In the present invention, in order to improve the onset temperature in dielectric loss and insulation breakdown voltage, it is desired that the polyester (A) be supplied along with the polyimide (B) into a twin-screw extruder to previously prepare a base blend with a weight fraction of $40/60$ to $60/40$ and that the blend be put in an extruder together with the polyester (A) and, when needed, with a material recovered from the blend so as to decrease the weight fraction of the polyimide (B). In this manner, a film is formed with the intended composition. When a film is used in which a basic blend has been prepared in advance with a high content of the polyimide (B) and has then been diluted with the polyester (A), a resin of the polyimide (B) can be made compatible with PET (the domain size of a dispersed polymer being about 10 nm or less). This permits a biaxially oriented polyester film for use in a high-quality capacitor to be formed with utmost ease and at low cost.

With regard to the specific conditions required for the process noted above as preferred, an explanation is given below.

Firstly, PET chips (A) and "Ultem" 1010 chips (B) are mixed at a constant ratio and then supplied to a vent-type twin-screw extruder heated at 270 to 300° C. By melt kneading in the extruder, blended chips are obtained. To this end, an extruder provided with a two-hole vent-type three-stage extrusion screw is preferred in which PET and "Ultem" are mixed by plasticization of PET, and "Ultem" is finely and uniformly dispersed and can be mixed in a nanometer order. In this instance, the shear rate ranges preferably from 100 to 300 $sec^{-1}$, and the retention time ranges preferably from 3 to 10 minutes.

Subsequently, the blended chips composed of PET and "Ultem" 1010 and prepared by pelletization as mentioned above, PET chips to be used for dilution, and when desired, raw materials recovered after film formation are mixed in their respective amounts as needed in setting a component of "Ultem" 1010 at a preset content (as % by weight). The mixture is dried in a vacuum at 180° C. for longer than 3 hours and then supplied into the extruder, followed by melt extrusion at 270 to 320° C. After being passed through a filter, the extrudate is discharged in sheet-like form from a T-die. This sheet is brought into close contact with the surface of a cooling drum with a surface temperature of 20 to 70° C. and then cooled and solidified. Thus, a nonstretched polyester film in a substantially unoriented state is obtained.

Secondly, the nonstretched polyester film is oriented by biaxial stretching. As a stretching method, spontaneous biaxial stretching or simultaneous biaxial stretching can be employed.

No particular restriction is imposed on the conditions under which biaxial stretching is effected. The film can be stretched both in the machine direction and in the transverse direction, respectively, at a stretch ratio of 3.0 to 6.0 times and at a single stage or a multiple stage with two or more steps. The stretch temperature may be at 90 to 180° C. It is desired that the biaxial stretching be performed in the machine and transverse directions at from a glass transition temperature (Tg) of a nonstretched polyester film to (Tg+40)° C. Restretching may be effected when it is found necessary. To provide the film of the present invention with an elongation at break set within the range specified according to this invention, the stretch ratio is set preferably at 3 to 4 times both in the machine direction and in the transverse direction, depending on the stretching method used and the stretching temperature used. In the case of a stretch ratio of 4 times or more, excessive orientation should be avoided with care. Subsequent to stretching, heat treatment can be performed at a temperature of from 210° C. to the melting point of the polyester (A) or lower, preferably 210 to 245° C., for 1 to 30 seconds. Further, relaxation may be effected at 1 to 9% in the transverse direction and/or in the machine direction during heat treatment and/or at an ensuing step at which the heat-treated film is cooled. This relaxation is helpful in obtaining the polyester film of the present invention for use in a heat-resistant capacitor. In this invention, the film thus formed may also be aged preferably at 50 to 120° C. for 5 minutes to 500 hours.

Next, a method for the production of the heat-resistant film-made capacitor according to the present invention will be described below.

A metallized film for use in a heat-resistant capacitor is formed using the polyester film for use in a heat-resistant capacitor obtained as described above, as a dielectric, and a metal foil or a thin metal sheet as a conductor. This metallized film is wound in a flat plate-like shape or a cylindrical shape to prepare a capacitor element. A metallized film using a thin metal sheet as a capacitor is preferred to reliably achieve the effects of the present invention. In such a case, as the process for the formation of a thin metal sheet, deposition, sputtering or the like can be employed, which are well known in the art. In particular, it is desired that a capacitor be produced by the use of a metal-deposited film in which a dielectric polyester film has a thickness of 0.8 to 8 $\mu$m, a deposited film has a thickness of 50 to 200 angstrom, or a metal sheet has a surface resistance of 0.5 to 5 $\Omega$/cm. This ensures that the effects of this invention are achieved.

Then, the capacitor element thus prepared is pressed, sealed on its end faces and fitted with lead wires, and where desired, is further supplied with voltage and treated with heat, all these steps being effected in a conventional fashion. Thus, a capacitor is provided. Here, pressing during preparation of the element can be performed preferably at a temperature of 120 to 180° C. and at a pressure of 20 to 100 kg/cm$^2$ for 1 to 30 minutes. These conditions prevent the charging life from becoming shortened even when the capacitor is partially damaged. A set of pressing conditions with a temperature of 120 to 145° C., a pressure of 20 to 60 kg/cm$^2$ and a time of 1 to 8 minutes are more preferable.

In the present invention, conventional corona discharge may be applied to the above-described polyester film for use in a heat-resistant capacitor. To make the film adhesive, heat-sealable, moisture-resistant, lubricative and surface-smooth, the film may be used as a construction in which it is formed by laminating various sorts of polymers one on another, or as a construction in which it is coated with an organic and/or inorganic composition. In addition, the capacitor of this invention may be impregnated with an insulating oil or the like such that it is used as a so-called oil-immersed condenser.

[Methods for Measuring Physical Properties and Evaluating Effects]

The methods for measuring the physical properties and evaluating the effects are given below.

(1) Inherent Viscosity

Based on the solution viscosity measured at 25° C. in ortho-chlorophenol, the value calculated from the following equation was used.

$$\eta sp/C=[\eta]+K[\eta]^2 \cdot C$$

where $\eta$sp is the value of (solution viscosity/solvent viscosity)-1, C is the weight of the polymer dissolved per 100 ml of the solvent (g/100 ml, usually 1.2), and K is the Huggins' constant (set at 0.343). The solution viscosity and solvent viscosity were measured using an Ostwald viscometer. The unit is in [dl/g].

(2) Glass Transition Temperature

The specific heat was measured according to the pseudo-isothermal method with the following instrument under the following conditions. Measurement was effected according to JIS K7121.

Instrument: Temperature modulation DSC manufactured by TA Instrument Co.

Measuring conditions:

Heating temperature: 270 to 570 K (RCS cooling method)

Temperature calibration: melting points of highly pure indium and tin

Temperature modulation amplitude: ±1 K

Temperature modulation period: 60 seconds

Temperature rise step: 5 K

Sample weight: 5 mg

Sample container: open container made of aluminum (22 mg)

Reference container: open container made of aluminum (18 mg)

(3) Surface Roughness (Ra, Rt)

A high precision thin film gap measuring instrument, ET-10, manufactured by Kosaka Kenkyusho Co. was used. The center line mean surface roughness (Ra, Rt) was obtained according to JIS-B-0601 at a stylus radius of 0.5 $\mu$m, a stylus pressure of 5 mg, a measuring length of 1 mm and a cutoff of 0.08 mm.

(4) Onset Temperature in Dielectric Loss (tan $\delta$)

The temperature properties of a test film having been deposited with aluminum on both of the surfaces were measured at a frequency of 60 Hz. The onset temperature was determined to be the temperature at which the extrapolated line arising from the gradient of tan $\delta$ intersects with the base line arising from the rise in temperature from room temperature.

Instrument: Dielectric constant analyzing instrument (DEA) Model 2970 manufactured by TA Instrument Co.

Measured area: 254.38 mm$^2$

Electrode pressure: 200 N

Temperature rise speed: 2° C./min (5) Insulation Resistance (IR)

Measurement was effected according to JIS-C-2318. To be more specific, aluminum was deposited on two surfaces of a test film to obtain a circular electrode with a diameter of 50 mm. In an oven constructed to be adjustably heated, the deposited sample was interposed between two plate electrodes made of brass, followed by application of a voltage through lead wires. The insulation resistance of the film was measured under the following conditions.

Oven temperature: 125° C.

Applied voltage: 250 V

Instrument: super insulation resistance tester "SM-8210" manufactured by Toa Denki Kogyo Co.

Based on the resistance value (A) measured, the insulation resistance (IR) was calculated from the following equation.

Insulation resistance ($\Omega \cdot$cm)=19.6×A/t where the numerical value of 19.6 is the electrode area (cm$^2$), A is the resistance value ($\Omega$) as read, and t is the film thickness (cm).

(6) Elongation at Break

An Instron type tensile tester was used to measure the machine direction of a test film according to the method specified in ASTM-D882 and under the following conditions.

Instrument: Film-strength elongation automatic measuring instrument "Tensilon AMF/RTA-100" manufactured by Orientec Co.

Sample size: width 10 mm, sample length 100 mm

Tensile speed: 200 mm/minute

Measuring environment: temperature 23° C., humidity 65% RH (7) Thermal Shrinkage A test film was measured in the machine direction according to JIS C2318 and under the following conditions.

Sample size: width 10 mm, distance between two gauge marks 200 mm

Measuring condition 1: temperature 150° C., processing time 30 minutes, unloaded The shrinkage was calculated from the following equation.

Thermal shrinkage $(\%)=[(L_0-L)/L_0]\times 100$ $L_0$: distance between two gauge marks before heat treatment L: distance between two gauge marks after heat treatment (8) Refractive Index The refractive index was measured according to the method specified in JIS K7105 with sodium D-line as the light source, using Abbe refractometer Model 4 manufactured by Atago Co. Methylene iodide was used as the mount liquid, and measurement was effected at 23° C. and 65% RH.

(9) Insulation Breakdown Voltage (DC-BDV)

Measurement was effected according to the method specified in JIS-C-2110 and at a temperature of 125° C. A 100 μm thick, 10 cm square electrode made of an aluminum foil was placed on the cathodic side, and a 25 mm diameter, 500 g weight electrode made of brass was placed on the anodic side. With a test film sandwiched between these electrodes, a voltage was applied using a high voltage direct current power source manufactured by Kasuga Co., and the voltage was raised from 0 V at a rate of 100 V/second. Insulation breakdown was determined to have been caused at the time a power of 10 mA or more flowed. This test was performed with 30 samples to obtain the average value of the samples. This value was determined to be the insulation breakdown voltage of the film.

(10) Capacitor Properties

[Production of Capacitor]

One surface of a polyester film was aluminum-deposited in a vacuum to have a surface resistance of 2 Ω/cm. This deposition was effected in a strip-like shape with marginal portions provided longitudinally on the film (58 mm wide deposited portions and 2 mm wide marginal portions being alternated with each other). Then, each of the deposited portions and each of the marginal portions were centrally slit with a blade to give a tape-like take-up reel of 30 mm in total width with a 1 mm wide margin remaining on the left and right side.

The left-margin tape and right-margin tape of the reel thus obtained were overlaid one on the other and wound to form a capacitor element having a capacity of 1.5 μF. As an outer covering, another 12 μm thick PET film was triply wound peripheral to the element. This capacitor element was pressed at a temperature of 130° C. at a pressure of 30 kg/cm$^2$ for 5 minutes. At both of the end faces of the resulting cylinder, metallikon was thermally sprayed to form an external electrode, and lead wires were welded to the metallikon. To the resulting capacitor sample, a voltage was applied once for 30 seconds at a direct current of 150 V/μm (as converted to film thickness). Similar treatment was once again performed with the polarities of the two lead wires placed into reversed relation to each other. The capacitor sample was checked as to whether or not the capacity was within ±10%, and the insulation resistance was 10000 Ω or more.

[Insulation Breakdown Voltage of Capacitor]

The above capacitor was left to stand for 24 hours in an oven heated at 125° C., and a voltage was applied from 0 V at a rate of 100 V/second. The voltage at which a power of more than 5 mA flowed causing insulation breakdown of the capacitor was determined to be the insulation breakdown voltage of the capacitor. In the present invention, this voltage refers to the average value of the insulation breakdown voltage values resulting from the testing of 30 capacitor samples. If the capacitance is large enough for a power of more than 5 mA to flow only with the charged power, such a power value can be set to properly separate the charged power from the power inducing insulation breakdown.

[Charging Life of Capacitor]

In an oven, 30 capacitors were placed under the following conditions. Each capacitor was provided with switch means for terminating voltage application at the time capacitor breakdown was caused and was connected to and in parallel with a direct power generator, and in this manner, a voltage was continuously applied. The charging life of the capacitor was determined based on the time required for the remainder of the capacitors to reduce by 80% or less (6 capacitors being broken).

(Condition 1), temperature: 125° C., voltage: 90 V/μm (Condition 2), temperature: 150° C., voltage: 50 V/μm

EXAMPLES

The present invention will now be described below with reference to representative examples and comparative examples.

Examples 1 to 9 and Comparative Examples 1 and 2

An ester interchange reaction was effected in a conventional manner using 100 parts by weight of dimethyl terephthalate and 0.10 parts by weight of calcium acetate as a catalyst. To the resulting product, 0.03 parts by weight of antimony trioxide, 0.15 parts by weight of trimethyl sulfate and 0.02 parts by weight of phosphorus acid were added, followed by polycondensation in a conventional manner. Thus, pellets of polyethylene terephthalate (PET) with an inherent viscosity of 0.65 were obtained.

Subsequently, 50 parts by weight of PET with an inherent viscosity of 0.65 were obtained here and 50 parts by weight of polyether imide, "Ultem" 1010 manufactured by GE Plastics Co., were dehumidified and dried at 150° C. for 5 hours and then supplied into a vent-type twin-screw extruder (L/D=40) provided with a screw of a two-screw three-thread type (a dissolving zone of a finely dispersed phase obtained through a kneading and plasticizing zone of PET and PEI/a Dulmage kneading zone/an inverted Dulmage screw for fine dispersion and compatibilization of these polymers) and heated at 320 to 290° C. (temperature gradients being set in a screw zone and at an extruder head). Melt extrusion was effected for a retention time of 3 minutes to obtain blended chips containing 50% by weight of Ultem. At that time, the vent hole was set at a vacuum degree of 200 Pa.

Then, the resulting blended chips, the above PET chips with an inherent viscosity of 0.65 and master chips (added at a step of the above PET condensation) containing 2% by weight of the inorganic particles shown in Table 1 were mixed in proportions (in % by weight) listed in Table 1. The mixture was dried in a vacuum at 180° C. for 3 hours and supplied into an extruder, followed by melt extrusion at 280° C. The extrudate was passed through a fiber-sintered stainless filter (cut at 8 µm) and discharged in a sheet-like shape from a T die. This sheet was brought into electrostatic contact with the surface of a cooling drum with a surface temperature of 25° C. and then solidified and cooled. Thus, a nonstretched polyester film was formed.

In succession, this nonstretched film was stretched in the machine direction under the conditions shown in Table 1 with a vertical stretching apparatus constructed with a plurality of heating rolls. The stretched film was introduced into a tenter with two opposite ends of the film clamped with clips, and it was stretched in the transverse direction under the conditions shown in Table 1. Upon heat treatment for 3 seconds at 235° C., the resulting film was relaxed by 3% in the transverse direction at the same temperature and further relaxed by 2% in the transverse direction in a 150° C. zone. By gradual cooling down to room temperature, a biaxially oriented polyester film with a thickness of 3.5 µm was formed.

With regard to the polyester film thus obtained, the inherent viscosity, surface roughness and refractive index in the thickness direction are shown in Table 1, and the glass transition temperature, tan δ-onset temperature, elongation at break in the machine direction, thermal shrinkage at 150° C. in the machine direction, insulation resistance at 125° C. and insulation breakdown voltage at 125° C. are shown in Table 2.

Furthermore, one surface of the polyester film according to the present invention was aluminum-deposited in a vacuum to have a surface resistance of 2 Ω/cm. Thus, a metallized film of this invention was formed for use in a heat-resistant capacitor. In addition, a film capacitor with heat resistance was produced using this metallized film for use in a heat-resistant capacitor. With regard to this film capacitor having heat resistance, the insulation breakdown voltage at 125° C. and charging life at 125° C. are shown in Table 2.

The polyester film of the present invention for use in a heat-resistant capacitor was found to be a polyester film having enhanced insulation breakdown voltage at 125° C. and excellent heat resistance because its glass transition temperature and elongation at break in the machine direction were within the ranges specified in this invention. A vacuum depositing apparatus was used, in the present invention, to deposit aluminum on one surface of the film in order to form a metallized film for use in a heat-resistant capacitor, but the film did not cause heat deterioration or heat stretching. A wind-type film capacitor, made of the metallized film of this invention thus obtained for use in a heat-resistant capacitor, was found to be high in insulation breakdown voltage at 125° C., long in charging life at 125° C. and excellent in heat resistance. Comparative Example 2 reveals that when the content of polyether imide (PEI) is larger, the film is higher in glass transition temperature, but is less stretchable and hence low in insulation breakdown voltage and poor in charging life. In Examples 8 and 9, since the films were outside the preferred range of surface roughness according to the present invention, they were likely to become thermally stretched or thermally deteriorated, when compared to Example 7, at the deposition step of forming a metallized film. The resulting capacitors were somewhat shorter in charging life than that of Example 7. The films of Comparative Examples 3 and 4 fell outside the range of elongation at break according to this invention, eventually becoming broken or stretched at the deposition step of forming a metallized film. The resulting capacitors were remarkably inferior in charging life to that of Example 2.

Example 10

The PET chips used in Example 1 in preparing the blended chips of PEI and PET were thermally crystallized at 180° C. and then treated (solid phase-condensed) for 14 hours at a temperature of 230° C. and at a vacuum degree of 100 Pa to prepare PET chips with an inherent viscosity of 0.85. Blended chips were prepared from the resulting PET chips together with PEI, and film formation was effected in the same manner as used in Example 3 except that the stretching conditions were changed as shown in Table 1. Thus, a biaxially oriented polyester film with a thickness of 3.5 µm was obtained. The results obtained from this film as evaluated are shown in Tables 1 and 2. Although the glass transition temperature of this film was nearly comparable to that of Example 3, the insulation breakdown voltage at 125° C. was higher than that of Example 3. The resulting capacitor was excellent in charging life compared to that of Example 3.

Example 11 and Comparable Examples 5 to 7

Dimethyl naphthalene-2,6-dicarboxylate and ethylene glycol were subjected to conventional ester interchange in the presence of manganese acetate, followed by addition of trimethyl phosphate. To this end, the amounts of manganese acetate and trimethyl phosphate to be added were adjusted to set each of manganese and phosphorus at a mol of 45 ppm. Upon subsequent addition of 0.02% by weight of antimony trioxide, conventional polycondensation was effected to obtain polyethylene-2,6-naphthalate (PEN) with an inherent viscosity of 0.62 (a melt temperature of 263° C.).

Subsequently, 50 parts by weight of PEN with an inherent viscosity of 0.62 obtained here and 50 parts by weight of polyether imide, "Ultem" 1010 manufactured by GE Plastics Co., were dehumidified and dried at 150° C. for 5 hours, and the mixture was supplied into a vent-type twin-screw extruder (L/D=40) provided with a screw of a two-screw three-thread type (a dissolving zone of a finely dispersed phase obtained through a kneading and plasticizing zone of PEN and PEI/a Dulmage kneading zone/an inverted Dulmage screw) and heated at 330 to 300° C. (temperature gradients being set in a screw zone and at an extruder head). Melt extrusion was effected for a retention time of 2 minutes to obtain blended chips containing 50% by weight of Ultem. At that time, the vent hole was set at a vacuum degree of 200 Pa.

Then, the resulting blended chips, the above PEN chips with an inherent viscosity of 0.62 and master chips (added at a step of the above PEN polycondensation) containing 2% by weight of the inorganic particles shown in Table 1 were mixed in proportions (in % by weight) listed in Table 1. The mixture was dried in a vacuum for 1 hour at 160° C. and further for 3 hours at 180° C. and supplied into an extruder, followed by melt extrusion at 290° C. The extrudate was passed through a fiber-sintered stainless filter (cut at 8 µm) and discharged in a sheet-like shape from a T die. This sheet was brought into electrostatic contact with the surface of a cooling drum with a surface temperature of 25° C. and then solidified and cooled. Thus, a nonstretched PEN film was formed.

In succession, this nonstretched film was stretched under the conditions shown in Table 1 using a vertical stretching apparatus constructed with a plurality of heating rolls and with reliance upon the differences in peripheral speed of the rolls. The stretched film was introduced into a tenter with two opposite ends of the film clamped with clips, and it was stretched in the transverse direction under the conditions shown in Table 1. After being treated with heat at 235° C. for 3 seconds, the resulting film was relaxed by 3% in the transverse direction at the same temperature and further relaxed by 2% in the transverse direction in a 150° C. zone. By gradual cooling down to room temperature, a biaxially oriented polyester film with a thickness of 3.5 μm was formed.

With regard to the polyester film obtained here, the inherent viscosity, surface roughness and refractive index in the thickness direction are shown in Table 1, and the glass transition temperature, tan δ-onset temperature, elongation at break in the machine direction, thermal shrinkage at 150° C. in the machine direction, insulation resistance at 125° C. and insulation breakdown voltage at 125° C. are shown in Table 2.

Furthermore, one surface of the polyester film according to the present invention was aluminum-deposited in a vacuum to have a surface resistance of 2 Ω/cm. Thus, a metallized film of this invention was formed for use in a heat-resistant capacitor. In addition, a heat-resistant capacitor was produced using this metallized film for capacitor use. With regard to this film capacitor with heat resistance, the insulation breakdown voltage at 125° C. and charging life at 125° C. are shown in Table 2.

The polyester film for use in a heat-resistant capacitor obtained in Example 11 was higher in glass transition temperature, longer in charging life and greater in heat resistance than the film obtained in Comparative Example 5. Because the films of Comparative Examples 6 and 7 were outside the range of elongation at break according to the present invention, they were liable to become broken or thermally deteriorated at the deposition step of forming a metallized film. The charging life of the resulting capacitor was remarkably shorter than the film of Example 11.

Examples 12 and 13

In these examples, other varieties of biaxially oriented polyester films are illustrated which were formed by the use of the following polyimides A and B in place of Ultem.

(1) Polyimide A

In an atmosphere of nitrogen gas, 200 g of isophorone diisocyanate was added to 3000 ml of N-methyl-2-pyrrolidone (MMP) and stirred. To this solution, 196 g of anhydrous pyromellitic acid was added at room temperature, followed by a gradual rise in temperature. Then, heating was effected at 180° C. for 6 hours at which time the generation of carbon dioxide was completed and the heating discontinued. After this polymer solution was washed by development in water, the resulting polymer was dried.

(2) Polyimide B

In a stream of nitrogen gas, 147 g (0.5 mol) of biphenyl tetracarboxylic acid dianhydride was poured into 300 g of N-methyl-2-pyrrolidone. To this solution, 57 g (0.5 mol) of trans-1,4-diaminocyclohexane, which had been dissolved in advance in 17.6 g of NMP, was added dropwise, followed by stirring for 2 hours at room temperature and further for 4 hours at 50° C. to obtain a polyamic acid solution. After being cooled, the solution was added to 500 ml of water to separate a polymer, and the separated polymer was collected by filtration and treated with heat in a nitrogen stream for 2 hours at 250° C. Thus, the intended polyimide was obtained.

Film formation was effected in the same manner as described in Example 2 except that the polyimides A and B obtained here were used in place of Ultem, whereby biaxially oriented polyester films of 3.5 μm in thickness were formed. Example 12 illustrates a film containing 10% by weight of the polyimide A, whereas Example 13 illustrates a film containing 10% by weight of the polyimide B.

With regard to each of the biaxially oriented films obtained here, the inherent viscosity, surface roughness and refractive index in the thickness direction are shown in Table 1, and the glass transition temperature, tan δ-onset temperature, elongation at break in the machine direction, thermal shrinkage at 150° C. in the machine direction, insulation resistance at 125° C. and insulation breakdown voltage at 125° C. are shown in Table 2.

Moreover, metallized films for use in a heat-resistant capacitor and film capacitors with heat resistance were formed in the same manner used in Example 2. The insulation breakdown voltage at 125° C. and charging life at 125° C. of each such heat-resistant film capacitor are shown in Table 2.

The films of Examples 12 and 13 formed by the use of polyimides other than Ultem were within the ranges of glass transition temperature and elongation at break disclosed in the present invention. By the application of these films, capacitors were obtained which had high insulation breakdown voltage, superior charging life and excellent heat resistance.

TABLE 1

| | Master chip composition (wt %) | | | | Stretching in machine direction | | Stretching in transverse direction | | Inherent viscosity | Surface roughness | Refractive index in thickness direction |
|---|---|---|---|---|---|---|---|---|---|---|---|
| | Polyimide | Particle 1 | Particle 2 | Particle 3 | Temperature (° C.) | Ratio (time) | Temperature (° C.) | Ratio (time) | (dl/g) | (Ra) (nm) | (-) |
| Comparative Example 1 | 0 | 0.3 | 0.1 | 0 | 90 | 3.5 | 95 | 3.6 | 0.60 | 48 | 1.485 |
| Example 1 | 5 | 0.3 | 0.1 | 0 | 95 | 3.6 | 100 | 3.7 | 0.61 | 50 | 1.496 |
| Example 2 | 10 | 0.3 | 0.1 | 0 | 100 | 3.6 | 105 | 3.7 | 0.62 | 51 | 1.505 |
| Example 3 | 15 | 0.3 | 0.1 | 0 | 100 | 3.6 | 105 | 3.7 | 0.62 | 53 | 1.516 |
| Example 4 | 20 | 0.3 | 0.1 | 0 | 105 | 3.6 | 110 | 3.8 | 0.62 | 55 | 1.525 |
| Example 5 | 30 | 0.3 | 0.1 | 0 | 105 | 3.5 | 110 | 3.6 | 0.62 | 56 | 1.535 |
| Comparative Example 2 | 40 | 0.3 | 0.1 | 0 | 120 | 3.0 | 125 | 3.5 | 0.62 | 59 | 1.545 |
| Example 6 | 15 | 0 | 0.1 | 0 | 100 | 3.6 | 105 | 3.7 | 0.62 | 46 | 1.512 |
| Example 7 | 15 | 0.3 | 0.2 | 0 | 100 | 3.6 | 105 | 3.7 | 0.62 | 85 | 1.516 |

TABLE 1-continued

| | Master chip composition (wt %) | | | | Stretching in machine direction | | Stretching in transverse direction | | Inherent viscosity (dl/g) | Surface roughness (Ra) (nm) | Refractive index in thickness direction (—) |
|---|---|---|---|---|---|---|---|---|---|---|---|
| | Polyimide | Particle 1 | Particle 2 | Particle 3 | Temperature (°C.) | Ratio (time) | Temperature (°C.) | Ratio (time) | | | |
| Example 8 | 15 | 0.2 | 0 | 0 | 100 | 3.6 | 105 | 3.7 | 0.62 | 8 | 1.516 |
| Example 9 | 15 | 0 | 0.1 | 0.1 | 100 | 3.6 | 105 | 3.7 | 0.62 | 145 | 1.518 |
| Example 10 | 15 | 0.3 | 0.1 | 0 | 105 | 3.7 | 110 | 3.8 | 0.65 | 50 | 1.512 |
| Comparative Example 3 | 10 | 0.3 | 0.1 | 0 | 110 | 3.8 | 105 | 4.2 | 0.62 | 48 | 1.497 |
| Comparative Example 4 | 10 | 0.3 | 0.1 | 0 | 100 | 2.6 | 105 | 2.7 | 0.62 | 55 | 1.525 |
| Example 11 | 10 | 0.3 | 0.1 | 0 | 140 | 3.8 | 145 | 3.9 | 0.61 | 47 | 1.490 |
| Comparative Example 5 | 0 | 0.3 | 0.1 | 0 | 135 | 3.8 | 135 | 4.3 | 0.60 | 51 | 1.478 |
| Comparative Example 6 | 10 | 0.3 | 0.1 | 0 | 140 | 4.2 | 145 | 4.5 | 0.61 | 46 | 1.482 |
| Comparative Example 7 | 10 | 0.3 | 0.1 | 0 | 140 | 3.2 | 145 | 3.8 | 0.61 | 50 | 1.510 |
| Example 12 | 10 | 0.3 | 0.1 | 0 | 105 | 3.6 | 110 | 3.7 | 0.60 | 53 | 1.507 |
| Example 13 | 10 | 0.3 | 0.1 | 0 | 105 | 3.6 | 110 | 3.7 | 0.60 | 54 | 1.502 |

TABLE 2

| | Film properties | | | | | Capacitor properties (lot of thickness = 3.5 μm) | | |
|---|---|---|---|---|---|---|---|---|
| | Glass transition temperature (°C.) | tan δ-onset temperature (°C.) | Insulation volume resistance (Ω·cm) | Elongation at break (%) | Thermal shrinkage (%) | Insulation breakdown voltage (V/μm) | Insulation breakdown voltage at 125° C. (kV) | Charging life at 125° C. (hr) |
| Comparative Example 1 | 103 | 82 | $6 \times 10^{13}$ | 115 | 1.9 | 360 | 0.51 | 420 |
| Example 1 | 121 | 89 | $9 \times 10^{14}$ | 119 | 1.3 | 410 | 0.78 | 950 |
| Example 2 | 128 | 95 | $2 \times 10^{15}$ | 113 | 1.2 | 420 | 0.81 | 1250 |
| Example 3 | 130 | 97 | $4 \times 10^{15}$ | 110 | 1.2 | 430 | 0.84 | 1450 |
| Example 4 | 135 | 98 | $5 \times 10^{15}$ | 106 | 1.1 | 435 | 0.83 | 1350 |
| Example 5 | 138 | 100 | $1 \times 10^{16}$ | 95 | 1.0 | 420 | 0.75 | 1250 |
| Comparative Example 2 | 149 | 94 | $3 \times 10^{16}$ | 75 | 0.6 | 380 | 0.70 | 650 |
| Example 6 | 131 | 97 | $4 \times 10^{15}$ | 113 | 1.2 | 425 | 0.83 | 1250 |
| Example 7 | 130 | 96 | $4 \times 10^{15}$ | 110 | 1.1 | 420 | 0.81 | 1350 |
| Example 8 | 130 | 96 | $4 \times 10^{15}$ | 112 | 1.1 | 415 | 0.61 | 850 |
| Example 9 | 131 | 97 | $3 \times 10^{15}$ | 106 | 1.2 | 390 | 0.58 | 750 |
| Example 10 | 129 | 97 | $5 \times 10^{15}$ | 117 | 1.2 | 455 | 0.89 | 1630 |
| Comparative Example 3 | 129 | 97 | $3 \times 10^{15}$ | 63 | 1.7 | 450 | 0.73 | 250 |
| Comparative Example 4 | 125 | 94 | $1 \times 10^{15}$ | 153 | 0.9 | 340 | 0.58 | 200 |
| Example 11 | 135 | 106 | $3 \times 10^{15}$ | 83 | 0.1 | 380 | 0.53 | 600 |
| Comparative Example 5 | 129 | 101 | $1 \times 10^{15}$ | 82 | 0.2 | 320 | 0.42 | 330 |
| Comparative Example 6 | 136 | 108 | $3 \times 10^{15}$ | 65 | 0.3 | 390 | 0.54 | 310 |
| Comparative Example 7 | 133 | 105 | $2 \times 10^{15}$ | 155 | 0.1 | 280 | 0.43 | 190 |
| Example 12 | 132 | 97 | $2 \times 10^{15}$ | 95 | 0.9 | 410 | 0.72 | 850 |
| Example 13 | 134 | 97 | $2 \times 10^{15}$ | 90 | 0.8 | 430 | 0.75 | 800 |

(23) PEI = polyether imide
(24) Particle 1 = dry type silica, average particle diameter: 0.4 μm
(25) Particle 2 = wet type silica, average particle diameter: 1.1 μm
(26) Particle 3 = wet type silica, average particle diameter: 2.1 μm Example 14

This example reveals the results in which the charging life was examined at 150° C. with regard to Examples 2, 3 and 11 and Comparative Examples 1, 3 and 6.

The evaluation results are shown in Table 3. Due to a lower potential frequency than in the 125° C. charging test described above, the films of the examples representing the present invention did not break at all over as long as 2000 hours or more. In contrast, the films of the comparative examples broke sooner since they were outside the glass transition temperature and/or elongation at break in the machine direction ranges specified by this invention.

TABLE 3

| | Charging life at 150° C. (hr) |
|---|---|
| Example 2 | 2200 |
| Example 3 | 3000 |
| Example 11 | 1400 |
| Comparative Example 1 | 450 |

TABLE 3-continued

| | Charging life at 150° C. (hr) |
|---|---|
| Comparative Example 3 | 440 |
| Comparative Example 5 | 300 |

INDUSTRIAL APPLICABILITY

According to the present invention, a polyester film for use in a capacitor having high heat resistance is obtained which has a high glass transition temperature and improved insulation breakdown voltage at high ambient temperature. In addition, the polyester film for capacitor use is formed into a metallized film, and a film capacitor obtained from such a metallized film for capacitor use is excellent in insulation breakdown voltage and charging life at a high ambient temperature. This polyester film is extensively applicable in the fields of capacitors and therefore is industrially significant.

What is claimed is:

1. A biaxially oriented polyester film for use in a capacitor having high heat resistance, comprising a polyester (A) as a main component and a polyimide (B), and having a glass transition temperature in the range of 105° C. to 145° C., an elongation at break in a machine direction of 80% to 150%, a surface roughness (Ra) in the range of 10 nm to 140 nm, and the polyimide (B) in a content in the range of 5 to 30% by weight based on the total of said film.

2. A polyester film for use in a capacitor having high heat resistance, according to claim 1, wherein the polyester (A) is a polyester composed mainly of ethylene terephthalate.

3. A polyester film for use in a capacitor having high heat resistance, according to claim 1, wherein the polyimide (B) is a polyimide composed of polyether imide.

4. A polyester film for use in a capacitor having high heat resistance, according to claim 1, which has an onset temperature of dielectric loss (tan $\delta$) in the range of 85° C. to 120° C.

5. A polyester film for use in a capacitor having high heat resistance, according to claim 1, which has an insulation volume resistance (IR) in the range of $1.0 \times 10^{14}$ $\Omega \cdot$cm to $5.0 \times 10^{16}$ $\Omega$cm at 125° C.

6. A polyester film for use in a capacitor having high heat resistance, according to claim 1, which has a thermal shrinkage of not more than 2.5% after a lapse of 30 minutes at 150° C.

7. A metallized film for use in a capacitor having high heat resistance, comprising one polyester film for us in a capacitor according to any one of claims 1, 2 to 5 and 6 and having a metallized layer disposed on at least one surface of said film.

8. A capacitor having high heat resistance, comprising the metallized film for in a capacitor according to clam 7.

* * * * *

UNITED STATES PATENT AND TRADEMARK OFFICE
CERTIFICATE OF CORRECTION

PATENT NO.    : 6,974,620 B1
DATED         : December 13, 2005
INVENTOR(S)   : Tsunekawa et al.

It is certified that error appears in the above-identified patent and that said Letters Patent is hereby corrected as shown below:

<u>Column 5,</u>
Line 49, change "35° C" to -- 350°C --.

Signed and Sealed this

Thirteenth Day of June, 2006

JON W. DUDAS
*Director of the United States Patent and Trademark Office*